J. B. GOODING.
Manufacture of Chronometer-Balances.

No. 157,319.  Patented Dec. 1, 1874.

Witnesses
S. W. Piper
L. N. Möller

James B. Gooding
by his attorney
R. H. Eddy

UNITED STATES PATENT OFFICE.

JAMES B. GOODING, OF WALTHAM, MASSACHUSETTS.

IMPROVEMENT IN THE MANUFACTURE OF CHRONOMETER-BALANCES.

Specification forming part of Letters Patent No. 157,319, dated December 1, 1874; application filed October 22, 1874.

*To all whom it may concern:*

Be it known that I, JAMES B. GOODING, of Waltham, of the county of Middlesex and State of Massachusetts, have invented a new and useful Improvement in the Art of Manufacturing Chronometer - Balances; and do hereby declare the same to be fully described in the following specification and represented in the accompanying drawings, of which—

Figure 1:
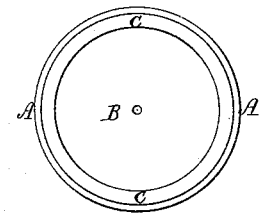
Figure 2:
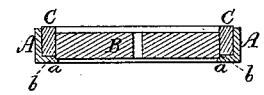
Figure 3:
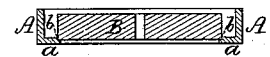
Figure 4:
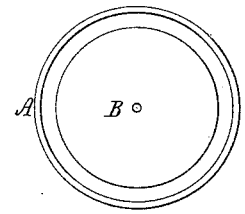

Figure 1 denotes a top view, and Fig. 2 a transverse section, of the parts of a compensation-balance, as formed and prepared for being subjected to the action of a furnace. Fig. 3 is a transverse section, and Fig. 4 a top view, of the steel blank and the brass tire-holder or capsule.

Compensation-balances for chronometers and fine time-keepers are usually made with a steel body and an encompassing ring of brass united together, the two metals having different degrees of expansion under any change of temperature. The brass has to be fused and welded to the steel. As usually accomplished, there is great danger of overheating the steel, particularly when the steel blank has a circular groove arranged concentrically in it and the brass melted into such groove. In this latter case the part outside of the brass or its groove, being usually narrow, is very liable to get overheated, so as to become brittle and too hard to work.

In carrying out my invention I make use of a flanged capsule or ring, A, the flange $a$ of which is extended inward from the lower edge of the ring, and is recessed or rabbeted concentrically, as shown at $b$, to receive the circular disk B of steel, and hold it concentrically with the said ring, there being between the inner circumference of the ring and the periphery of the disk an annular space for reception of a brass ring or envelope, C, which is to fill the space and rest on the flange $a$.

The said flanged ring-holder or capsule A I make of brass having a greater proportion of copper than the brass composing the ring C, in order that it shall not melt at the temperature at which the ring C would melt, but require a higher temperature to melt. I also form the capsule A of a metal or composition of metals such as will melt at a temperature below that at which the steel blank will bear without injury, the object being to prevent the said blank from being overheated in the furnace.

Having arranged the capsule, the steel blank, and the brass ring together in manner as shown in Figs. 1 and 2, and put upon the ring a proper quantity of flux, I introduce the whole into a furnace, and there subject the three to a temperature sufficient to melt the brass ring and cause it to weld or braze to the blank and the capsule.

While the capsule may remain intact the blank will not be overheated; but in case of the temperature being too high, or sufficient to damage the blank, the capsule and brass ring will be melted down. Thus, so long as the capsule may remain entire, we have evidence that the blank has not been overheated.

I claim—

As an improvement in the art of manufacturing chronometer-balances, surrounding the steel disk with a flanged ring of metal whose melting-point is below that which would injure the steel, and interposing another ring of metal whose melting-point is below that of the outer ring, and then or next applying to the same a degree of heat sufficient to melt the said second or interposed ring, to unite the metal thereof with the disk and outer ring, for the purpose set forth.

JAMES B. GOODING.

Witnesses:
R. H. EDDY,
J. R. SNOW.